United States Patent
Iwamoto et al.

(10) Patent No.: US 11,703,163 B2
(45) Date of Patent: Jul. 18, 2023

(54) THREADED CONNECTION FOR STEEL PIPE

(71) Applicant: NIPPON STEEL CORPORATION, Tokyo (JP)

(72) Inventors: Michihiko Iwamoto, Tokyo (JP); Yusuke Toyota, Tokyo (JP); Yasuhiro Kochi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 126 days.

(21) Appl. No.: 17/421,500

(22) PCT Filed: Mar. 3, 2020

(86) PCT No.: PCT/JP2020/009003
§ 371 (c)(1),
(2) Date: Jul. 8, 2021

(87) PCT Pub. No.: WO2020/195621
PCT Pub. Date: Oct. 1, 2020

(65) Prior Publication Data
US 2022/0082189 A1 Mar. 17, 2022

(30) Foreign Application Priority Data
Mar. 27, 2019 (JP) .................. 2019-060590

(51) Int. Cl.
*F16L 15/06* (2006.01)
*F16L 15/00* (2006.01)

(52) U.S. Cl.
CPC ............ *F16L 15/002* (2013.01); *F16L 15/06* (2013.01)

(58) Field of Classification Search
CPC .......... F16L 15/06; F16L 15/08; E21B 17/042
See application file for complete search history.

(56) References Cited

U.S. PATENT DOCUMENTS

| | | | | |
|---|---|---|---|---|
| 1,942,518 | A | * | 1/1934 | Protin .................... E21B 17/042 285/333 |
| 3,468,563 | A | * | 9/1969 | Duret ..................... E21B 17/042 373/91 |
| 4,549,754 | A | * | 10/1985 | Saunders ................. F16L 15/06 285/334.4 |
| 4,641,410 | A | | 2/1987 | Plaquin et al. |
| 4,962,579 | A | * | 10/1990 | Moyer ..................... F16L 15/08 285/334 |
| 5,233,742 | A | | 8/1993 | Gray et al. |

(Continued)

FOREIGN PATENT DOCUMENTS

| CN | 109113591 A | 1/2019 |
|---|---|---|
| JP | 06109173 A | 4/1994 |

(Continued)

*Primary Examiner* — David Bochna
(74) *Attorney, Agent, or Firm* — Greer Burns & Crain Ltd.

(57) ABSTRACT

A threaded connection for steel pipe is provided that can be made up quickly and appropriately. The threaded connection includes a steel pipe 20m, a steel pipe 20f, and a coupling 50 for connecting the steel pipes 20m and 20f. The pipe bodies 21m and 21f of the steel pipes 20m and 20f include annular marking grooves 23m and 23f, respectively, formed on the outer peripheries of the pipe bodies 21m and 21f.

10 Claims, 3 Drawing Sheets

(56) References Cited

U.S. PATENT DOCUMENTS

| | | | | |
|---|---|---|---|---|
| 7,416,374 B2* | 8/2008 | Breihan | ................ | E21B 17/042 |
| | | | | 285/334 |
| 8,668,232 B2* | 3/2014 | Mazzaferro | ........... | E21B 17/042 |
| | | | | 285/333 |
| 9,874,058 B2* | 1/2018 | Benedict | ................ | E21B 17/042 |
| 11,067,205 B2* | 7/2021 | Iwamoto | ............... | F16L 15/004 |
| 2003/0098585 A1 | 5/2003 | Tsujimura | | |
| 2004/0026924 A1* | 2/2004 | Kessler | ................ | F16L 15/004 |
| | | | | 285/390 |
| 2008/0067808 A1* | 3/2008 | Poddar | .................... | F16L 15/08 |
| | | | | 285/92 |
| 2009/0282921 A1 | 11/2009 | Hoshino et al. | | |
| 2010/0078936 A1* | 4/2010 | Nakamura | ............ | E21B 17/042 |
| | | | | 285/334 |
| 2011/0101684 A1* | 5/2011 | Leng | ....................... | F16L 15/06 |
| | | | | 285/332.2 |
| 2019/0203857 A1 | 7/2019 | Maruta et al. | | |
| 2020/0025315 A1 | 1/2020 | Iwamoto et al. | | |

FOREIGN PATENT DOCUMENTS

| | | | |
|---|---|---|---|
| JP | 2001214437 | A | 8/2001 |
| JP | 2004169812 | A | 6/2004 |
| WO | 0186185 | A1 | 11/2001 |
| WO | 2003076837 | A3 | 5/2004 |
| WO | 2005040657 | A2 | 5/2005 |
| WO | 2008029957 | A1 | 3/2008 |
| WO | 2018052141 | A1 | 3/2018 |
| WO | 2018180218 | A1 | 10/2018 |

\* cited by examiner

THREADED CONNECTION FOR STEEL PIPE

This is a National Phase Application filed under 35 U.S.C. § 371, of International Application No. PCT/JP2020/009003, filed Mar. 3, 2020, the contents of which are incorporated by reference.

TECHNICAL FIELD

The present disclosure relates to a threaded connection for steel pipe and, more particularly, to a coupling-type threaded connection for connecting two steel pipe.

BACKGROUND ART

Steel pipes called oil-well pipes are used, for example, for prospecting or production in oil wells, natural-gas wells etc. (hereinafter collectively referred to as "oil wells" or the like), for developing non-conventional resources such as oil sand or shale gas, for retrieving or storing carbon dioxide (Carbon dioxide Capture and Storage (CCS)), for geothermal power generation, or in hot springs. A threaded connection is used to connect steel pipes.

Such threaded connections for steel pipe are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of a steel pipe is screwed into a female thread of the coupling such that they are made up and connected. An integral connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of another steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". Such a pin and a box constitute ends of pipes and thus are tubular in shape.

An oil well is drilled along while its side wall is reinforced by oil-well pipes to prevent the side wall from collapsing during digging, which results in multiple oil-well pipes arranged in one another. In recent years, both on-land and offshore oil wells have become deeper and deeper; in such environments, to connect oil-well pipes, threaded connections in which the inner and outer diameters of the connection portions are generally equal to, or slightly larger than, the inner and outer diameters of the steel pipes are often used, in order to improve efficiency in developing oil wells. The use of such threaded connections minimizes the gaps between the oil-well pipes arranged in one another, which improves efficiency in developing a deep oil well without significantly increasing the diameter of the well. A threaded connection is required to have good sealability against pressure fluid from the inside (hereinafter also referred to as "internal pressure") and pressure fluid from the outside (hereinafter also referred to as "external pressure") under the above-described restrictions as to the inner and outer diameters. Further, if oil-well pipes are used in an oil well with great depth, for example, thermal expansion of a pipe may apply large tensile loads or compression loads to the associated threaded connection. In such environments, too, a threaded connection is required to have good sealability.

Known threaded connections that ensure sealability include ones having a seal that uses metal-to-metal contact (hereinafter referred to as "metal seal"). A metal seal is constructed such that the pin has a sealing surface with a diameter that is slightly larger than the pin has a sealing surface with a diameter of a sealing surface of the box and, when the threaded connection is made up and the sealing surfaces are fitted together, the diameter of the sealing surface of the pin decreases and the diameter of the sealing surface of the box increases, which produces elastic recovery forces in each of the sealing surfaces with which they try to return to their original diameters, thus generating contact pressures on the sealing surfaces, which now adhere to each other along the entire periphery to provide sealability. Other known threaded connections that ensure sealability include ones constructed to provide sealability by means of their threaded portions, without a metal seal or using a metal seal in addition to the threaded portions. Specifically, a connection is constructed in such a manner that, in regions of the threaded portions with a predetermined length or more as measured when the connection is made up, the clearance between the thread faces of the pin and box is small and a viscous lubricant called dope is present inside this clearance, and an interference in thread diameter between the pin and box provides contact pressures on the thread faces (this construction will be hereinafter referred to as "thread seal (construction)". Threaded connections that provide sealability against internal and external pressures by virtue of such a seal are also known.

The following prior art documents are incorporated herein by reference.

[Patent Document 1] WO 2018/180218 A1
[Patent Document 2] WO 2018/052141 A1
[Patent Document 3] U.S. Pat. No. 5,233,742 A
[Patent Document 4] WO 2001/086185 A1
[Patent Document 5] WO 2008/029957 A1
[Patent Document 6] WO 2005/040657 A1
[Patent Document 7] U.S. Pat. No. 4,641,410 A

SUMMARY OF THE DISCLOSURE

An object of the present disclosure is to provide a threaded connection for steel pipe that can be made up quickly and appropriately.

A threaded connection for steel pipe according to the present disclosure includes: a first steel pipe; a second steel pipe; and a coupling adapted to connect the first and second steel pipes. The first steel pipe includes a first pipe body and a first pin, the first pin being tubular in shape. The first pin is formed to be contiguous to the first pipe body and located at a tip of the first steel pipe. The second steel pipe includes a second pipe body and a second pin, the second pin being tubular in shape. The second pin is formed to be contiguous to the second pipe body and located at a tip of the second steel pipe. The coupling includes a first box and a second box, the first and second boxes being tubular in shape. The first box is made up on the first pin as the first pin is inserted therein. The second box is located to be opposite to the first box, the second box being made up on the second pin as the second pin is inserted therein. Each of the first and second pins includes a male thread formed on an outer periphery of the pin. Each of the first and second boxes includes a female thread formed on an inner periphery of the box to correspond to the associated one of the male threads. The male and female threads are trapezoidal threads and tapered threads. At least a portion of each of the male and female threads constitutes a thread seal when the connection is made up. The male thread includes a male thread crest, a male thread root, a male thread stabbing flank located closer to a tip of the pin, and a male thread load flank located farther from the tip of the pin. The male thread stabbing flank includes a first male thread stabbing stage located farther from a pipe axis of the steel pipe and having a stabbing angle of −10 to 15 degrees and a second male thread stabbing stage located closer to the pipe axis and having a stabbing angle of 20 to 60 degrees. The second male thread stabbing stage has a height of 20 to 60% of a height of the male thread. The female thread includes a female thread crest adapted to face the male thread root, a female thread root adapted to face the male thread crest, a female thread stabbing flank adapted to face the male thread stabbing flank, and a female thread load flank adapted to face the male thread load flank. The female thread stabbing flank includes a first female thread stabbing stage located farther from the pipe axis and having a stabbing angle equal to the stabbing angle of the first male thread stabbing stage, and a second female thread stabbing stage located closer to the pipe axis and having a stabbing angle equal to the stabbing angle of the second male thread stabbing stage. The first pin further includes a first pin shoulder surface on the tip of the first pin. The second pin further includes a second pin shoulder surface on the tip of the second pin, the second pin shoulder surface being adapted to be in contact with the first pin shoulder surface when the connection is made up. The first pipe body includes a first marking groove formed on an outer periphery of the first pipe body, the first marking groove being annular in shape.

EMBODIMENTS FOR CARRYING OUT THE INVENTION

Figure 1:
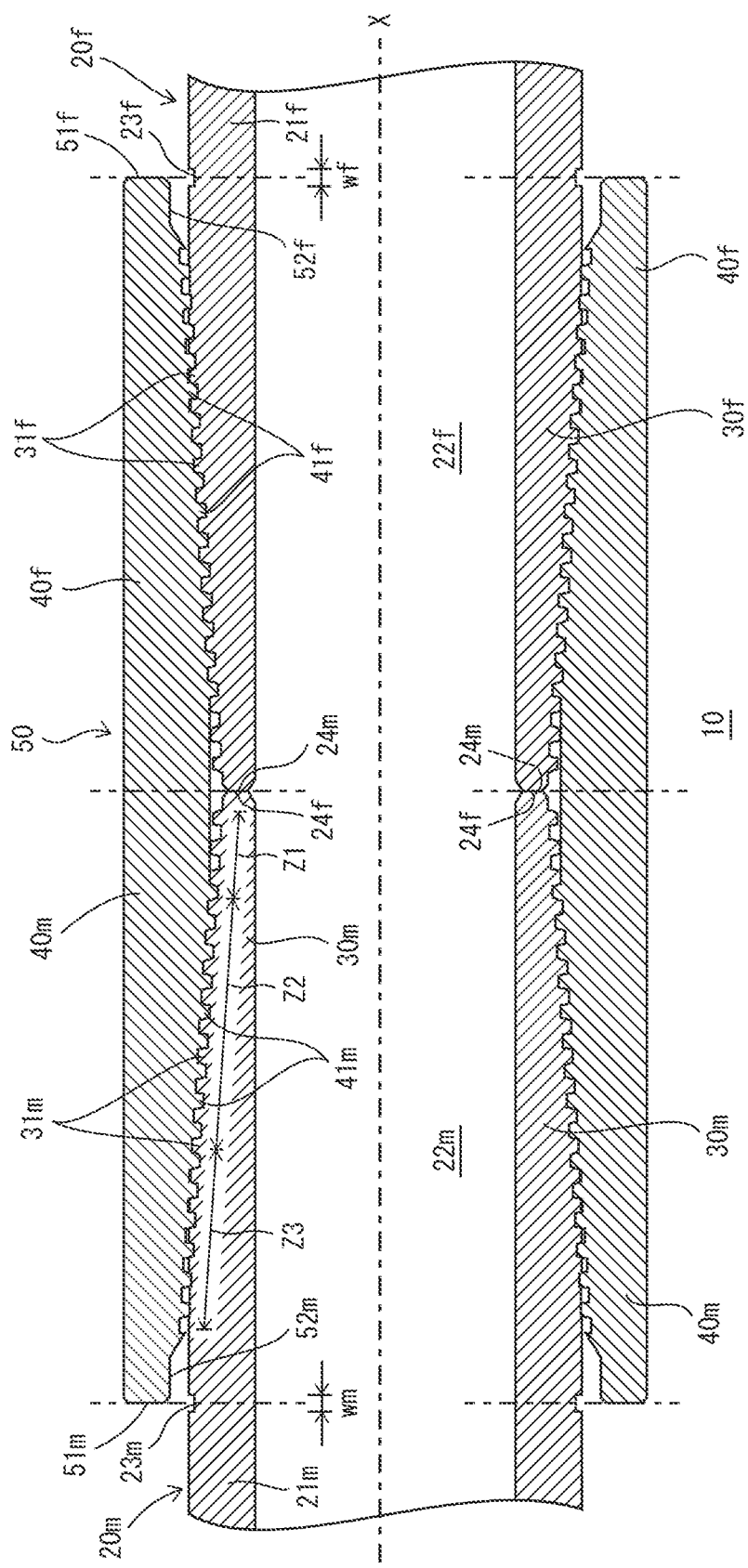
FIG. 1 is a longitudinal cross-sectional view of a threaded connection for steel pipe according to an embodiment, taken along the pipe-axis direction.

A threaded connection for steel pipe according to the present embodiment includes: a first steel pipe; a second steel pipe; and a coupling adapted to connect the first and second steel pipes. The first steel pipe includes a first pipe body and a first pin, the first pin being tubular in shape. The first pin is formed to be contiguous to the first pipe body and located at a tip of the first steel pipe. The second steel pipe includes a second pipe body and a second pin, the second pin being tubular in shape. The second pin is formed to be contiguous to the second pipe body and located at a tip of the second steel pipe. The coupling includes a first box and a second box, the first and second boxes being tubular in shape. The first box is made up on the first pin as the first pin is inserted therein. The second box is located to be opposite to the first box, the second box being made up on the second pin as the second pin is inserted therein. Each of the first and second pins includes a male thread formed on an outer periphery of the pin. Each of the first and second boxes includes a female thread formed on an inner periphery of the box to correspond to the associated one of the male threads. The male and female threads are trapezoidal threads and tapered threads. At least a portion of each of the male and female threads constitutes a thread seal when the connection is made up. The male thread includes a male thread crest, a male thread root, a male thread stabbing flank located closer to a tip of the pin, and a male thread load flank located farther from the tip of the pin. The male thread stabbing flank includes a first male thread stabbing stage located farther from a pipe axis of the steel pipe and having a stabbing angle of −10 to 15 degrees and a second male thread stabbing stage located closer to the pipe axis and having a stabbing angle of 20 to 60 degrees. The second male thread stabbing stage has a height of 20 to 60% of a height of the male thread. The female thread includes a female thread crest adapted to face the male thread root, a female thread root adapted to face the male thread crest, a female thread stabbing flank adapted to face the male thread stabbing flank, and a female thread load flank adapted to face the male thread load flank. The female thread stabbing flank includes a first female thread stabbing stage located farther from the pipe axis and having a stabbing angle equal to the stabbing angle of the first male thread stabbing stage, and a second female thread stabbing stage located closer to the pipe axis and having a stabbing angle equal to the stabbing angle of the second male thread stabbing stage. The first pin further includes a first pin shoulder surface on the tip of the first pin. The second pin further includes a second pin shoulder surface on the tip of the second pin, the second pin shoulder surface being adapted to be in contact with the first pin shoulder surface when the connection is made up. The first pipe body includes a first marking groove formed on an outer periphery of the first pipe body, the first marking groove being annular in shape.

This embodiment allows the first and second steel pipes to be made up on the coupling quickly and appropriately.

The second pipe body may include a second marking groove formed on an outer periphery of the second pipe body, the second marking groove being annular in shape. The first marking groove may have a width smaller than a width of the second marking groove.

Such an implementation makes it easier to appropriately make up the first steel pipe on the coupling and allows the second steel pipe to be quickly made up on the coupling.

The first box further includes a first recess, the first recess being tubular in shape. The first recess is located at an open end of the first box and has an inner peripheral surface facing an outer peripheral surface of the first pipe body and spaced apart from the outer peripheral surface of the first pipe body. The second box may further include a second recess, the second recess being tubular in shape. The second recess is located at an open end of the second box and has an inner peripheral surface facing an outer peripheral surface of the second pipe body and spaced apart from the outer peripheral surface of the second pipe body.

In such an implementation, dope does not reach the marking groove through the open end of the coupling.

The portion of each of the male thread of the second pin and the female thread of the second box that constitutes the thread seal may have an amount of interference in thread diameter smaller than an amount of interference in thread diameter of the portion of each of the male thread of the first pin and the female thread of the first box that constitutes the thread seal.

Such an implementation reduces the amount of rotation of the first pin caused by corotation during the process of screwing in the second steel pipe.

The male thread of the first pin and the female thread of the first box may include a perfect-thread portion and an imperfect-thread portion formed between the first pipe body and the perfect-thread portion. The first pin and the first box may be bonded together along the entire imperfect-thread portion or part thereof when the connection is made up.

Such an implementation reduces the amount of rotation of the first pin caused by corotation during the process of screwing in the second steel pipe.

The steel pipe may have an outer diameter exceeding 16 inches.

A pipe assembly according to the present embodiment includes: a first steel pipe; and a coupling adapted to connect the first steel pipe to a second steel pipe. The first steel pipe includes a first pipe body and a first pin, the first pin being tubular in shape. The first pin is formed to be contiguous to the first pipe body and located at a tip of the first steel pipe. The coupling includes a first box and a second box, the first and second boxes being tubular in shape. The first box is made up on the first pin as the first pin is inserted therein. The second box is located to be opposite to the first box, the second box being made up on a second pin of the second steel pipe as the second pin is inserted therein. The first pin includes a male thread formed on an outer periphery of the pin. The first box includes a female thread formed on an inner periphery of the box to correspond to the male thread. The male and female threads are trapezoidal threads and tapered threads. At least a portion of each of the male and female threads constitutes a thread seal when the connection is made up. The male thread includes a male thread crest, a male thread root, a male thread stabbing flank located closer to the tip of the pin, and a male thread load flank located farther from the tip of the pin. The male thread stabbing flank includes a first male thread stabbing stage located farther from a pipe axis of the steel pipe and having a stabbing angle of −10 to 15 degrees and a second male thread stabbing stage located closer to the pipe axis and having a stabbing angle of 20 to 60 degrees. The second male thread stabbing stage has a height of 20 to 60% of a height of the male thread. The female thread includes a female thread crest adapted to face the male thread root, a female thread root adapted to face the male thread crest, a female thread stabbing flank adapted to face the male thread stabbing flank, and a female thread load flank adapted to face the male thread load flank. The female thread stabbing flank includes a first female thread stabbing stage located farther from the pipe axis and having a stabbing angle equal to the stabbing angle of the first male thread stabbing stage, and a second female thread stabbing stage located closer to the pipe axis and having a stabbing angle equal to the stabbing angle of the second male thread stabbing stage. The first pin further includes a first pin shoulder surface on the tip of the first pin. The first pipe body includes a first marking groove formed on an outer periphery of the first pipe body, the first marking groove being annular in shape. An open end of the first box is positioned within a width of the first marking groove.

Now, an embodiment of the threaded connection for steel pipe will be described with reference to the drawings. The same or corresponding portions in drawings are labeled with the same characters, and the same description will not be repeated.

Referring to FIG. 1, the threaded connection 10 is a coupling-type connection that includes a steel pipe 20*m*, a steel pipe 20*f*, and a coupling 50 for connecting the steel pipes 20*m* and 20*f*. The steel pipes 20*m* and 20*f* may be any steel pipes having an outer diameter exceeding 16 inches. The steel pipe 20*m* includes a pipe body 21*m* and a tubular pin 30*m*. The pin 30*m* is formed to be contiguous to the pipe body 21*m* and at the tip 22*m* of the steel pipe 20*m*. The steel pipe 20*f* includes a pipe body 21*f* and a tubular pin 30*f*. The pin 30*f* is formed to be contiguous to the pipe body 21*f* and at the tip 22*f* of the steel pipe 20*f*. The coupling 50 includes a tubular box 40*m* and a tubular box 40*f*. The box 40*m* is made up on the pin 30*m* as the pin 30*m* is inserted therein. The box 40*f* is located opposite to the box 40*m* and is made up on the pin 30*f* as the pin 30*f* is inserted therein. Each of the pins 30*m* and 30*f* includes a male thread 31*m*, 31*f* formed on the outer periphery of the pin 30*m*, 30*f*. Each of the boxes 40*m* and 40*f* includes a female thread 41*m*, 41*f* formed on the inner periphery of the box 40*m*, 40*f* to correspond to the male thread 31*m*, 31*f*. The male threads 31*m* and 31*f* and female threads 41*m* and 41*f* are trapezoidal threads and tapered threads.

The pin 30*m* is made up on the box 40*m* at the factory in advance, and thus may be referred to as "mill end". The pin 30*f* is made up on the box 40*f* at the oil well, and thus may be referred to as "field end".

Each of the male threads 31*m* and 31*f* is formed on the outer periphery of the pin 30*m*, 30*f* and is helical in shape, where the diameter of the helix decreases toward the tip of the pin 30*m*, 30*f* (or pin shoulder surface 24*m*, 24*f*). Each of the female threads 41*m* and 41*f* is formed on the inner periphery of the box 40*m*, 40*f* and is helical in shape, where the diameter of the helix increases toward the open end 51*m*, 51*f* of the box 40*m*, 40*f*. A preferred taper ratio of the tapered threads is 6.0 to 18.0%. The taper ratio is set such that the length of the resulting thread portions is appropriate in view of the wall thicknesses of the steel pipes 20*m* and 20*f*. The taper ratio may be constant, while it is preferable that the taper ratio of each of the male threads 31*m* and 31*f* decrease as it goes away from the tip of the pin 30*m*, 30*f*.

When the connection is made up, at least portions of the male threads 31*m* and 31*f* and female threads 41*m* and 41*f* constitute a thread seal. The portions of the male threads 31*m* and 31*f* and female threads 41*m* and 41*f* that constitute the thread seal have an axial length three times as large as the wall thickness of the steel pipes 20*m* and 20*f* or more. The portions of the male threads 31*m* and 31*f* and female threads 41*m* and 41*f* constituting the thread seal are perfect threads. The larger the length of the thread seal, the better the sealability. Still, if the length of the thread seal is excessively large, this requires costs and work for thread-cutting, and may also raise the possibility of galling occurring during make-up. The length of the thread seal is preferably not larger than eight times the wall thickness. While the threaded connection 10 includes such a thread seal, it includes no metal seal. Alternatively, a Teflon (registered trademark) ring seal may be used together with a thread seal. Dope is present in the clearance between the thread-seal surfaces. The presence of dope between the surfaces improves sealability.

The portions of the male thread 31*m* of the pin 30*m* and the female thread 41*m* of the box 40*m* that constitute the thread seal (hereinafter referred to as "thread-seal portions") have an amount of interference in thread diameter smaller than the amount of interference in thread diameter of the portions of the male thread 31*f* of the pin 30*f* and the female thread 41*f* of the box 40*f* (i.e., thread-seal portions). Amount of interference in thread diameter is defined as the difference between the outer diameter of the thread-seal portions of the pins 30m and 30f and the inner diameter of the corresponding thread-seal portions of the boxes 40m and 40f. The outer diameter of the male threads 31m and 31f of the pins 30m and 30f, at the thread-seal portions, is larger than the inner diameter of the female threads 41m and 41f of the boxes 40m and 40f at the corresponding portions. That is, the amount of interference in thread diameter takes a positive value throughout the entire thread-seal portions.

The pin 30m further includes a pin shoulder surface 24m on the tip of the pin 30m. The pin 30f further includes a pin shoulder surface 24f on the tip of the pin 30f, which is in contact with the pin shoulder surface 24m when the connection is made up. The threaded connection 10 has a so-called "pin-to-pin" construction. Typically, in the threaded connection 10 according to the present embodiment, the pin 30m at the mill end is first made up on the box 40m. Thereafter, at the oil well, the pin 30f at the field end is made up on the box 40f. As a result, the pin shoulder surface 24f of the pin 30f is in contact with the pin shoulder surface 24m of the pin 30m.

The pipe body 21m includes an annular marking groove 23m. The marking groove 23m is formed on the outer periphery of the pipe body 21m. The pipe body 21f includes an annular marking groove 23f. The marking groove 23f is formed on the outer periphery of the pipe body 21f. The marking groove 23m has a width wm smaller than the width wf of the marking groove 23f (wm<wf). The marking grooves 23m and 23f are formed by using a bite to cut the pipe bodies 21m and 21f while using a lathe to rotate the steel pipes 20m and 20f. As such, each of the marking grooves 23m and 23f extends circumferentially and make one turn around the pipe body 21m, 21f.

More specifically, at the field end, the marking groove 23f is located at ±α with respect to the open end 51f of the box 40f (for example, α=0.75 mm). The width wf of the marking groove 23f is 2α (for example, 1.5 mm). On the other hand, at the mill end, the side of the marking groove 23m located farther from the tip is located at +(α−β) and the side of groove closer to the tip is located at −α with respect to the open end 51m of the box 40m. Here, β≤3/4α (for example, 0.5 mm). The width wm of the marking groove 23m is 2α−β (for example, 1.0 mm). Thus, the open end 51m of the box 40m is positioned within the width wm of the marking groove 23m.

The box 40m further includes a tubular recess 52m. The recess 52m has an inner peripheral surface formed on the open end of the box 40m and facing the outer peripheral surface of the pipe body 21m and spaced apart from that outer peripheral surface. The box 40f further includes a tubular recess 52f. The recess 52f has an inner peripheral surface formed on the open end of the box 40f and facing the outer peripheral surface of the pipe body 21f and spaced apart from that outer peripheral surface. Each of the recesses 52m and 52f has a longitudinal length of 15 mm, for example, and at least 5 mm.

Figure 2:
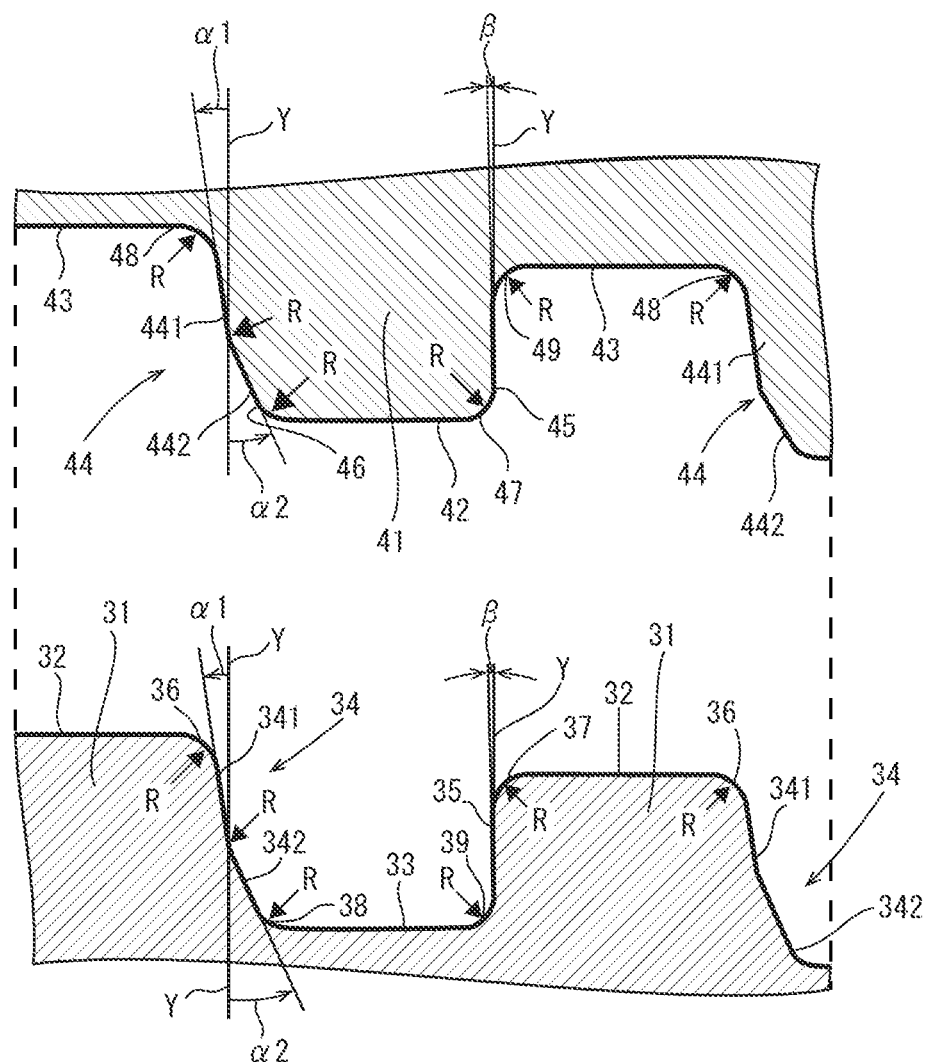
FIG. 2 is an enlarged longitudinal cross-sectional view of the connection, depicting the shapes of the male and female threads shown in FIG. 1.
Figure 3:
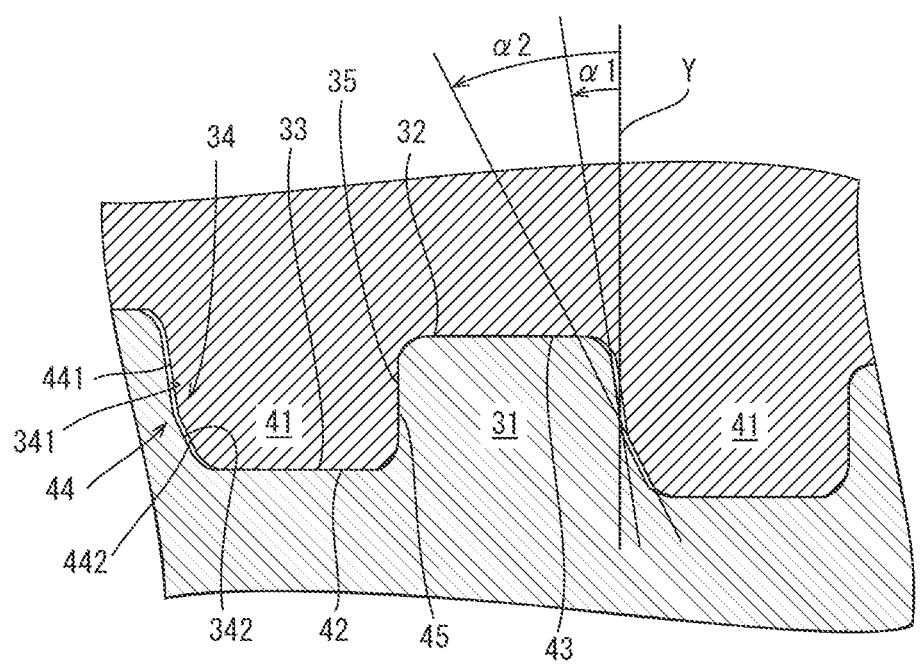
FIG. 3 is an enlarged longitudinal cross-sectional view of the connection, depicting the male and female threads shown in FIG. 1.

Referring to FIGS. 2 and 3, each of the male threads 31m and 31f (hereinafter collectively labeled "31") includes a male thread crest 32, a male thread root 33, a male thread stabbing flank 34, and a male thread load flank 35. The male thread stabbing flank 34 is located closer to the tip of the pin 30m, 30f. The male thread load flank 35 is located farther from the tip of the pin 30m, 30f.

The male thread stabbing flank 34 includes two male thread stabbing stages 341 and 342. The male thread stabbing stage 341 is located farther from the pipe axis X of the steel pipe 20 and has a stabbing angle α1. The male thread stabbing stage 342 is located closer to the pipe axis X and has a stabbing angle α2. Stabbing angle α1, α2 is defined as the angle at which the male thread stabbing flank 34 (i.e., male thread stabbing stage 341, 342) is inclined from a plane Y perpendicular to the pipe axis X. If the stabbing flank 34 overhangs, the stabbing angle α1 is negative. The stabbing angle α2 is larger than the stabbing angle α1 (α2>α1). The stabbing angle α1 is −10 to 15 degrees. The upper limit for the stabbing angle α1 is preferably 14 degrees, more preferably 13 degrees, and still more preferably 12 degrees. The smaller α1, the higher the compression resistance. The lower limit for the stabbing angle α1 is preferably 0 degrees, and more preferably 8 degrees. On the other hand, the larger α1, the easier the cutting for forming the threads. The stabbing angle α1 is about 10 degrees, for example. The stabbing angle α2 is 20 to 60 degrees. The upper limit for the stabbing angle α2 is preferably 50 degrees, more preferably 40 degrees, and still more preferably 32 degrees. The smaller α2, the higher the composition resistance. The lower limit for the stabbing angle α2 is preferably 23 degrees, more preferably 26 degrees, and still more preferably 28 degrees. The larger α2, the less likely a cross thread is to be produced. The stabbing angle α2 is about 30 degrees, for example. As such, a portion of the male thread stabbing flank 34 located about halfway up is depressed.

The height of the male thread stabbing stage 342 (i.e., distance from the male thread root 33 up to the border between the male thread stabbing stages 341 and 342) is 25 to 60%, for example 35%, of the height of the male thread.

Each of the female threads 41m and 41f (hereinafter collectively labeled "41") includes a female thread crest 42, a female thread root 43, a female thread stabbing flank 44, and a female thread load flank 45. The female thread crest 42 faces the male thread root 33. The female thread root 43 faces the male thread crest 32. The female thread stabbing flank 44 faces the male thread stabbing flank 34. The female thread load flank 45 faces the male thread load surface 35.

The female thread stabbing flank 44 includes two female thread stabbing stages 441 and 442. The female thread stabbing stage 441 is located farther from the pipe axis X and has a stabbing angle α1 equal to the stabbing angle α1 of the male thread stabbing stage 341. The female thread stabbing stage 442 is located closer to the pipe axis X and has a stabbing angle α2 equal to the stabbing angle α2 of the male thread stabbing stage 342. As such, a portion of the female thread stabbing flank 44 located about halfway up is bulged. The stabbing angles α1 and α2 of the male thread stabbing stages 341 and 342 may not be exactly equal to the stabbing angles α1 and α2 of the female thread stabbing stages 441 and 442, respectively, and they are only required to be substantially equal. In other words, the stabbing angles α1 and α2 may have errors resulting from the cutting step.

It is preferably that the female thread stabbing stage 442 have a height equal to the height of the male thread stabbing stage 342. This prevents the clearance between the thread faces of the pin and box from becoming unnecessarily large, allowing the thread seal construction to exhibit good sealability. The height of the male thread stabbing stage 342 and the height of the female thread stabbing stage 442 may not be exactly equal, and they are only required to be substantially equal. In other words, these heights may have errors resulting from the cutting step.

The male thread 31 further includes male thread round faces 36 to 39. The male thread round face 36 is formed at the corner between the male thread crest 32 and male thread stabbing flank 34. The male thread round face 37 is formed at the corner between the male thread crest 32 and male thread load flank 35. The male thread round face 38 is formed at the corner between the male thread root 33 and male thread stabbing flank 34. The male thread round face 39 is formed at the corner between the male thread root 33 and male thread load flank 35.

The female thread 41 includes female thread round faces 46 to 49. The female thread round faces 46 is formed at the corner between the female thread crest 42 and female thread stabbing flank 44. The female thread round face 47 is formed at the corner between the female thread crest 42 and female thread load flank 45. The female thread round face 48 is formed at the corner between the female thread root 43 and female thread stabbing flank 44. The female thread round face 49 is formed at the corner between the female thread root 43 and female thread load flank 45.

The round faces 36 to 39 and 46 to 49 are so-called "R" surfaces (i.e., round chamfered surfaces), and have a predetermined radius of curvature. The radius of curvature is 0.1 to 1.2 mm, and preferably 0.3 to 0.8 mm.

The male thread load flank 35 has a load angle β. Load angle β is defined as the angle at which the male thread load angle 35 is inclined from a plane Y perpendicular to the pipe axis X. If the load flank 35 overhangs. the load angle β is negative. The load angle β is −10 to 3 degrees, and preferably −5 to −1 degree, for example about −3 degrees. The female thread load flank 45 has a load angle β equal to the load angle β of the male thread load flank 35. The load angle β of the male thread load flank 35 and the load angle β of the female thread load flank 45 may not be exactly equal, and they are only required to be substantially equal. In other words, the load angle β may have errors resulting from the cutting step.

The male thread crest 32, male thread root 33, female thread crest 42 and female thread root 43 are parallel to the pipe axis X. Specifically, the lines representing the faces 32, 33, 42 and 43 in a longitudinal cross section containing the pipe axis X are parallel to the pipe axis X.

As shown in FIG. 3, the male thread stabbing flank 34 and female thread stabbing flank 44 form clearances with a dimension of 60 to 120 μm when the connection is made up. Further, the male thread crest 32 and female thread root 43 form clearances sized at 0 to 50 μm when the connection is made up. The male thread root 33 and female thread crest 42 also form clearances sized at 0 to 50 μm when the connection is made up.

Now, an exemplary method of manufacturing the threaded connection 10, i.e., a method of making up two steel pipes 20*m* and 20*f* using a coupling 50 will be explained.

At the factory, the mill-end pin 30*m* of the steel pipe 20*m* is screwed into the box 40*m*. At this time, the pin 30*m* is screwed in to such an extent that the open end 51*m* of the box 40*m* is within the range represented by the width wm of the marking groove 23*m*. Thus, the mill-end steel pipe 20*m* is made up on the coupling 50. The mill-end steel pipe 20*m* and the coupling 50 constitute a pipe assembly, and such a pipe assembly is shipped from the factory to an oil well.

Then, at the oil well, the field-end pin 30*f* of the steel pipe 20*f* is screwed into the box 40*f*. At this time, the pin 30*f* is screwed in while the steel pipes 20*m* and 20*f* are gripped, without the coupling 50 being gripped. Further, the pin 30*f* is screwed in to such an extent that the open end 51*f* of the box 40*f* is within the range represented by the width wf of the marking groove 23*f*. Thus, the field-end steel pipe 20*f* is made up on the coupling 50. As a result of this make-up of the two steel pipes 20*m* and 20*f* by the coupling 50, the threaded connection 10 is manufactured.

While the mill-end pin 30*m* of the steel pipe 20*m* is screwed into the box 40*m*, torque gradually increases as the screw-in advances, but no rapid torque increases occurs. Thus, unlike during screw-in for the field end discussed below, the appropriate make-up position cannot easily be recognized from changes in torque. However, since the threaded connection 10 includes a marking groove 23*m*, for the mill end, one may visually observe the positional relationship between the marking groove 23*m* and the open end 51*m* of the box 40*m* while making up the steel pipe 20*m* on the coupling 50 at a desired position.

For the field end, as the steel pipe 20*f* is screwed in, the pin shoulder surface 24*f* of the pin 30*f* abuts the pin shoulder surface 24*m* of the mill end. At this moment, make-up torque rapidly increases. Thus, one may screw in the steel pipe 20*f* while monitoring these changes in torque to make up the steel pipe 20*f* on the coupling 50 to an appropriate torque. Still, for verification purposes, monitoring is required to determine the increase in torque each time one steel pipe has been made up.

To address this, a marking groove 23*f* is formed on the steel pipe 20*f* as well to allow one to visually observe the positional relationship between the open end 51*f* of the box 40*f* and the marking groove 23*f* after the steel pipe 20*f* has been tightened to a predetermined appropriate torque. This allows one to make up the steel pipe 20*f* on the coupling 50 quickly and appropriately without meticulously performing the above-mentioned step of monitoring torque changes.

Whether the steel pipe 20*f* can be appropriately made up significantly depends on whether the steel pipe 20*m*, which is made up first, has been appropriately made up. In view of this, the make-up of the mill-end steel pipe 20*m* can be controlled more precisely if the groove width wm of the marking groove 23*m* at the mill end is smaller than the groove width wf of the marking groove 23*f* at the field end.

This will enable make-up without exactly monitoring make-up torque at the oil well field. This will eliminate the necessity for equipment for monitoring make-up torque, facilitating running and improving efficiency.

Further, the recesses 52*m* and 52*f* are provided on the open ends of the boxes 40*m* and 40*f*. As such, even when dope in the clearances between the thread seal surfaces seeps out, it remains in the clearance between the recess 52*m*, 52*f* and the pipe body 21*m*, 21*f*. Thus, dope does not reach the marking groove 23*m*, 23*f* through the open end 51*m*, 51*f* of the coupling 50. As a result, visually observing the positional relationship between the marking groove 23*m*, 23*f* and open end 51*m*, 51*f* is always possible.

Further, the amount of interference in thread diameter at the field end is smaller than the amount of interference in thread diameter at the mill end. As such, the contact pressure between the pin 30*f* and box 40*f* during screw-in of the steel pipe 20*f* is smaller than the contact pressure between the pin 30*m* and box 40*m* until the pin shoulder surface 24*f* contacts the pin shoulder surface 24*m*. Thus, the amount of rotation at the mill end caused by corotation during make-up at the field end may be zero or below an acceptable level. "Corotation" is a phenomenon in which, when the field-end steel pipe 20*f* is rotated to screw the pin 30*f* into the box 40*f*, the coupling 50 rotates together with the steel pipe 20*f*, i.e., rotates relative to the mill-end steel pipe 20*m*. The amount of interference in thread diameter at the mill end is preferably below a predetermined value to prevent galling. The amount of interference in thread diameter at the field end is preferably above a predetermined level to increase the sealability of the thread seal.

The mill-end pin 30m and the box 40m include zones Z1 to Z3, arranged in this order starting from the tip of the pin 30m. The male thread 31m of the mill-end pin 30m and the female thread 41m of the box 40m may include a perfect-thread portion and an imperfect-thread portion formed between the pipe body 21m and the perfect-thread portion. The perfect-thread portion is located in the zone Z2. Imperfect-thread portions are located in the zones Z1 and Z3. The mill-end pin 30m and box 40m may be bonded together along the imperfect-thread portion in the zone Z3 when the connection is made up. Specifically, the pin 30m and box 40m may be bonded together along the entire imperfect-thread portion in the zone Z3 or part thereof. In addition, the pin 30m and box 40m may be bonded together along portions of the perfect-thread portion adjacent to the imperfect-thread portions. If the mill-end pin 30m and box 40m are bonded together, the amount of rotation of the mill end due to corotation can be zero or smaller than a tolerance during the process of screwing in the field-end steel pipe 20f.

Prior to make-up of the mill end, an adhesive is applied to the zone Z3, along which the pin 30m and box 40m are to be bonded together, and dope is applied to the zone Z2. This prevents galling and makes it easier to provide a certain level of sealability to the thread seal. The adhesive may be applied to the entire zone Z3, or may be applied to part of the zone Z3. Further, the adhesive may be applied so as to even cover a portion of the zone Z2 adjacent to the zone Z3. Further, the adhesive may be applied to the male thread 31m only or the female thread 41m only, or both.

While an embodiment has been described, the present invention is not limited to the above-illustrated embodiment, and various modifications are possible without departing from the spirit of the invention.

EXPLANATION OF CHARACTERS

10: threaded connection
20m, 20f: steel pipes
21m, 21f: pipe bodies
23m, 23f: marking grooves
24m, 24f: pin shoulder surfaces
30m, 30f: pins
31, 31m, 31f: male threads
32: male thread crest
33: male thread root
34: male thread stabbing flank
341, 342: male thread stabbing stages
35: male thread load flank
40m, 40f: boxes
41, 41m, 41f: female thread
42: female thread crest
43: female thread root
44: female thread stabbing flank
441, 442: female thread stabbing stages
45: female thread load flank
50: coupling
51m, 51f: open ends
52m, 52f: recesses

The invention claimed is:

1. A threaded connection comprising:
a first steel pipe;
a second steel pipe; and
a coupling adapted to connect the first and second steel pipes,
the first steel pipe including:
a first pipe body; and
a first pin, the first pin being tubular in shape, the first pin being formed to be contiguous to the first pipe body and located at a tip of the first steel pipe,
the second steel pipe including:
a second pipe body; and
a second pin, the second pin being tubular in shape, the second pin being formed to be contiguous to the second pipe body and located at a tip of the second steel pipe,
the coupling including:
a first box, the first box being tubular in shape, the first box being adapted to be made up on the first pin as the first pin is inserted therein; and
a second box, the second box being tubular in shape, the second box being located to be opposite to the first box, the second box being adapted to be made up on the second pin as the second pin is inserted therein,
each of the first and second pins including a male thread formed on an outer periphery of the pin,
each of the first and second boxes including a female thread formed on an inner periphery of the box to correspond to the associated one of the male threads,
the male and female threads being trapezoidal threads and tapered threads,
at least a portion of each of the male and female threads constituting a thread seal when the connection is made up,
the male thread including:
a male thread crest;
a male thread root;
a male thread stabbing flank located closer to a tip of the pin; and
a male thread load flank located farther from the tip of the pin,
the male thread stabbing flank including:
a first male thread stabbing stage located farther from a pipe axis of the steel pipe and having a stabbing angle of −10 to 15 degrees; and
a second male thread stabbing stage located closer to the pipe axis and having a stabbing angle of 20 to 60 degrees,
the second male thread stabbing stage having a height of 20 to 60% of a height of the male thread,
the female thread including:
a female thread crest adapted to face the male thread root;
a female thread root adapted to face the male thread crest;
a female thread stabbing flank adapted to face the male thread stabbing flank; and
a female thread load flank adapted to face the male thread load flank,
the female thread stabbing flank including:
a first female thread stabbing stage located farther from the pipe axis and having a stabbing angle equal to the stabbing angle of the first male thread stabbing stage; and
a second female thread stabbing stage located closer to the pipe axis and having a stabbing angle equal to the stabbing angle of the second male thread stabbing stage,
the first pin further including a first pin shoulder surface on the tip of the first pin,
the second pin further including a second pin shoulder surface on the tip of the second pin, the second pin shoulder surface being adapted to be in contact with the first pin shoulder surface when the connection is made up, the first pipe body including a first marking groove formed on an outer periphery of the first pipe body, the first marking groove being annular in shape.

2. The threaded connection according to claim 1, wherein:
the second pipe body includes a second marking groove formed on an outer periphery of the second pipe body, the second marking groove being annular in shape; and
the first marking groove has a width smaller than a width of the second marking groove.

3. The threaded connection according to claim 2, wherein:
the first box further includes a first recess, the first recess being tubular in shape, the first recess being located at an open end of the first box and having an inner peripheral surface facing an outer peripheral surface of the first pipe body and spaced apart from the outer peripheral surface of the first pipe body; and
the second box further includes a second recess, the second recess being tubular in shape, the second recess being located at an open end of the second box and having an inner peripheral surface facing an outer peripheral surface of the second pipe body and spaced apart from the outer peripheral surface of the second pipe body.

4. The threaded connection according to claim 1, wherein the portion of each of the male thread of the second pin and the female thread of the second box that constitutes the thread seal has an amount of interference in thread diameter smaller than an amount of interference in thread diameter of the portion of each of the male thread of the first pin and the female thread of the first box that constitutes the thread seal.

5. The threaded connection according to claim 1, wherein:
the male thread of the first pin and the female thread of the first box include a perfect-thread portion and an imperfect-thread portion formed between the first pipe body and the perfect-thread portion; and
the first pin and the first box are bonded together along the entire imperfect-thread portion or part thereof when the connection is made up.

6. The threaded connection according to claim 1, wherein the first and second steel pipes have an outer diameter exceeding 16 inches.

7. A pipe assembly comprising:
a first steel pipe; and
a coupling adapted to connect the first steel pipe to a second steel pipe,
the first steel pipe including:
a first pipe body; and
a first pin, the first pin being tubular in shape, the first pin being formed to be contiguous to the first pipe body and located at a tip of the first steel pipe,
the coupling including:
a first box, the first box being tubular in shape, the first box being adapted to be made up on the first pin as the first pin is inserted therein; and
a second box, the second box being tubular in shape, the second box being located to be opposite to the first box, the second box being adapted to be made up on a second pin of the second steel pipe as the second pin is inserted therein,
the first pin including a male thread formed on an outer periphery of the pin,
the first box including a female thread formed on an inner periphery of the box to correspond to the male thread,
the male and female threads being trapezoidal threads and tapered threads,
at least a portion of each of the male and female threads constituting a thread seal when the connection is made up,
the male thread including:
a male thread crest;
a male thread root;
a male thread stabbing flank located closer to the tip of the pin; and
a male thread load flank located farther from the tip of the pin,
the male thread stabbing flank including:
a first male thread stabbing stage located farther from a pipe axis of the steel pipe and having a stabbing angle of −10 to 15 degrees; and
a second male thread stabbing stage located closer to the pipe axis and having a stabbing angle of 20 to 60 degrees,
the second male thread stabbing stage having a height of 20 to 60% of a height of the male thread,
the female thread including:
a female thread crest adapted to face the male thread root;
a female thread root adapted to face the male thread crest;
a female thread stabbing flank adapted to face the male thread stabbing flank; and
a female thread load flank adapted to face the male thread load flank,
the female thread stabbing flank including:
a first female thread stabbing stage located farther from the pipe axis and having a stabbing angle equal to the stabbing angle of the first male thread stabbing stage; and
a second female thread stabbing stage located closer to the pipe axis and having a stabbing angle equal to the stabbing angle of the second male thread stabbing stage,
the first pin further including a first pin shoulder surface on the tip of the first pin,
the first pipe body including a first marking groove formed on an outer periphery of the first pipe body, the first marking groove being annular in shape, and
an open end of the first box being positioned within a width of the first marking groove.

8. The pipe assembly according to claim 7, wherein the first box further includes a first recess, the first recess being tubular in shape, the first recess being located at an open end of the first box and having an inner peripheral surface facing an outer peripheral surface of the first pipe body and spaced apart from the outer peripheral surface of the first pipe body.

9. The pipe assembly according to claim 7, wherein:
the male thread of the first pin and the female thread of the first box include a perfect-thread portion and an imperfect-thread portion formed between the first pipe body and the perfect-thread portion; and
the first pin and the first box are bonded together along the entire imperfect-thread portion or part thereof when the connection is made up.

10. The pipe assembly according to claim 7, wherein the first steel pipe has an outer diameter exceeding 16 inches.

* * * * *